US012420627B2

(12) United States Patent
Kondoh (10) Patent No.: US 12,420,627 B2
(45) Date of Patent: Sep. 23, 2025

(54) VEHICLE

(71) Applicant: TOYOTA JIDOSHA KABUSHIKI KAISHA, Toyota (JP)

(72) Inventor: Keisuke Kondoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 18/214,723

(22) Filed: Jun. 27, 2023

(65) Prior Publication Data

US 2024/0075805 A1    Mar. 7, 2024

(30) Foreign Application Priority Data

Sep. 5, 2022   (JP) ................... 2022-140669

(51) Int. Cl.
    *B60K 11/08*    (2006.01)
(52) U.S. Cl.
    CPC .................................. *B60K 11/08* (2013.01)
(58) Field of Classification Search
    CPC ....... B60K 11/08; B60K 11/06; B60K 11/085; B60K 11/04
    See application file for complete search history.

(56) References Cited

U.S. PATENT DOCUMENTS

| 4,653,788 A * | 3/1987 | Di Giusto | B60R 19/48 |
| | | | 296/180.1 |
| 8,631,889 B2 * | 1/2014 | Begleiter | B60T 5/00 |
| | | | 180/68.1 |
| 10,160,308 B2 * | 12/2018 | Chae | B60K 11/08 |
| 10,569,643 B2 * | 2/2020 | Gilotte | B60K 11/08 |
| 11,945,423 B2 * | 4/2024 | Moradnia | F16D 65/847 |

FOREIGN PATENT DOCUMENTS

| JP | 62-166138 A | 7/1987 |
| JP | 2005-178427 A | 7/2005 |
| JP | 2007-137168 A | 6/2007 |

* cited by examiner

*Primary Examiner* — John D Walters
(74) *Attorney, Agent, or Firm* — Dinsmore & Shohl LLP (57) ABSTRACT

A vehicle includes: a grille opening through which cooling air is introduced; a radiator air guide duct that guides cooling air introduced from the grille opening to a radiator; and a left brake duct that is connected to both ends of the radiator air guide duct in the vehicle width direction and guides a part of the flowing cooling air toward the brake of the front wheel, wherein the vehicle includes a backflow suppression plate protruding from a center side plate of the left brake duct toward the inside of the left brake duct.

3 Claims, 6 Drawing Sheets

VEHICLE

CROSS-REFERENCE TO RELATED APPLICATION

This application claims priority to Japanese Patent Application No. 2022-140669 filed on Sep. 5, 2022 incorporated herein by reference in its entirety.

BACKGROUND

1. Technical Field

The present disclosure relates to a structure of a vehicle including a brake cooling duct for a front wheel.

2. Description of Related Art

A structure for cooling a brake of a front wheel of a vehicle has been proposed. For example, Japanese Unexamined Patent Application Publication No. 62-166138 (JP 62-166138 A) discloses a structure in which a front bumper of a vehicle is configured by a hollow member, an air intake opening for introducing cooling air into a radiator is provided at a front end of the hollow member, the air that flows into the air intake opening is guided to both ends of the hollow member, and the air is blown out from the tip of ducts attached to respective ends toward the brakes of the front wheels to cool the brakes of the front wheels.

Further, Japanese Unexamined Patent Application Publication No. 2005-178427 (JP 2005-178427 A) discloses a structure in which a duct that introduces air into a brake of a front wheel from an opening provided in a front bumper is provided, and a heat exchanger and a fan are installed inside the duct such that the brake of the front wheel can be cooled even when the vehicle speed is low.

SUMMARY

In the configuration described in JP 62-166138 A, there is a case where, hot air after passing through the radiator when the vehicle is stopped or the like flows back through the duct and flows to an upstream side of the radiator, whereby the cooling performance of the radiator deteriorates.

On the basis of the above, an object of the present disclosure is to provide a vehicle capable of cooling a brake of a front wheel when the vehicle is traveling while deterioration in performance of a radiator when the vehicle is stopped is suppressed.

A vehicle according to a first aspect of the present disclosure includes: a grille opening that is provided in a center of a design panel in a vehicle width direction at a front end of the vehicle and that introduces cooling air; a radiator air guide duct that guides the cooling air introduced from the grille opening to a radiator; a brake duct that is connected to each end of the radiator air guide duct in the vehicle width direction and that guides a part of the cooling air flowing into the radiator air guide duct toward a brake of a front wheel; and a backflow suppression plate. The backflow suppression plate protrudes from a center side plate of the brake duct or a rear plate of the radiator air guide duct toward an inner side of the brake duct. The backflow suppression plate is configured to suppress hot air after passing through the radiator from flowing back through the brake duct and from flowing toward an upstream side of the radiator.

As described above, since the backflow suppression plate protrudes toward the inner side from the center side plate of the brake duct, it is possible to suppress the hot air that has passed through the radiator from flowing back along the surface of the center side plate of the brake duct and to suppress the hot air from flowing to the upstream side of the radiator, when the vehicle is stopped. Further, when the vehicle is traveling, the cooling air can be guided toward the brake of the front wheel from a flow path between the tip of the backflow suppression plate and an outer plate of the brake duct on the outer side in the vehicle width direction. With the above, it is possible to cool the brake of the front wheel when the vehicle is traveling while deterioration in performance of the radiator when the vehicle is stopped is suppressed.

In the vehicle of the present disclosure, the backflow suppression plate may be attached to the center side plate. The backflow suppression plate may be inclined such that a tip of the backflow suppression plate is separated from the center side plate toward a downstream side of the brake duct.

With the above, it is possible to effectively suppress the hot air from flowing back along the surface of the center side plate of the brake duct, and to suppress the hot air from flowing into the upstream side of the radiator.

In the vehicle of the present disclosure, the backflow suppression plate may be attached to the rear plate of the radiator air guide duct.

The backflow suppression plate may protrude from a connecting portion between the rear plate and the center side plate to the inner side of the brake duct toward a downstream side of the brake duct.

The backflow suppression plate may be inclined with respect to the center side plate such that a tip of the backflow suppression plate is separated from the center side plate toward the downstream side of the brake duct.

With the above, it is possible to suppress the hot air from flowing back along the surface of the center side plate of the brake duct with a simple configuration.

According to the present disclosure, it is possible to provide a vehicle capable of cooling a brake of a front wheel when the vehicle is traveling while deterioration in performance of a radiator when the vehicle is stopped is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle 100 according to an embodiment will be described with reference to the drawings. The arrow FR, the arrow UP, and the arrow RH shown in the drawings indicate the front side, the upper side, and the right side of the vehicle 100, respectively. In addition, the opposite directions of the arrow FR, UP, RH indicate the rear side, the lower side, and the left side. Hereinafter, in the case of simply describing the front-rear direction, the left-right direction, and the up-down direction, the front-rear direction, the left-right direction, and the up-down direction of the vehicle 100 in the front-rear direction, and the up-down direction of the vehicle will be described unless otherwise specified.

Figure 1:
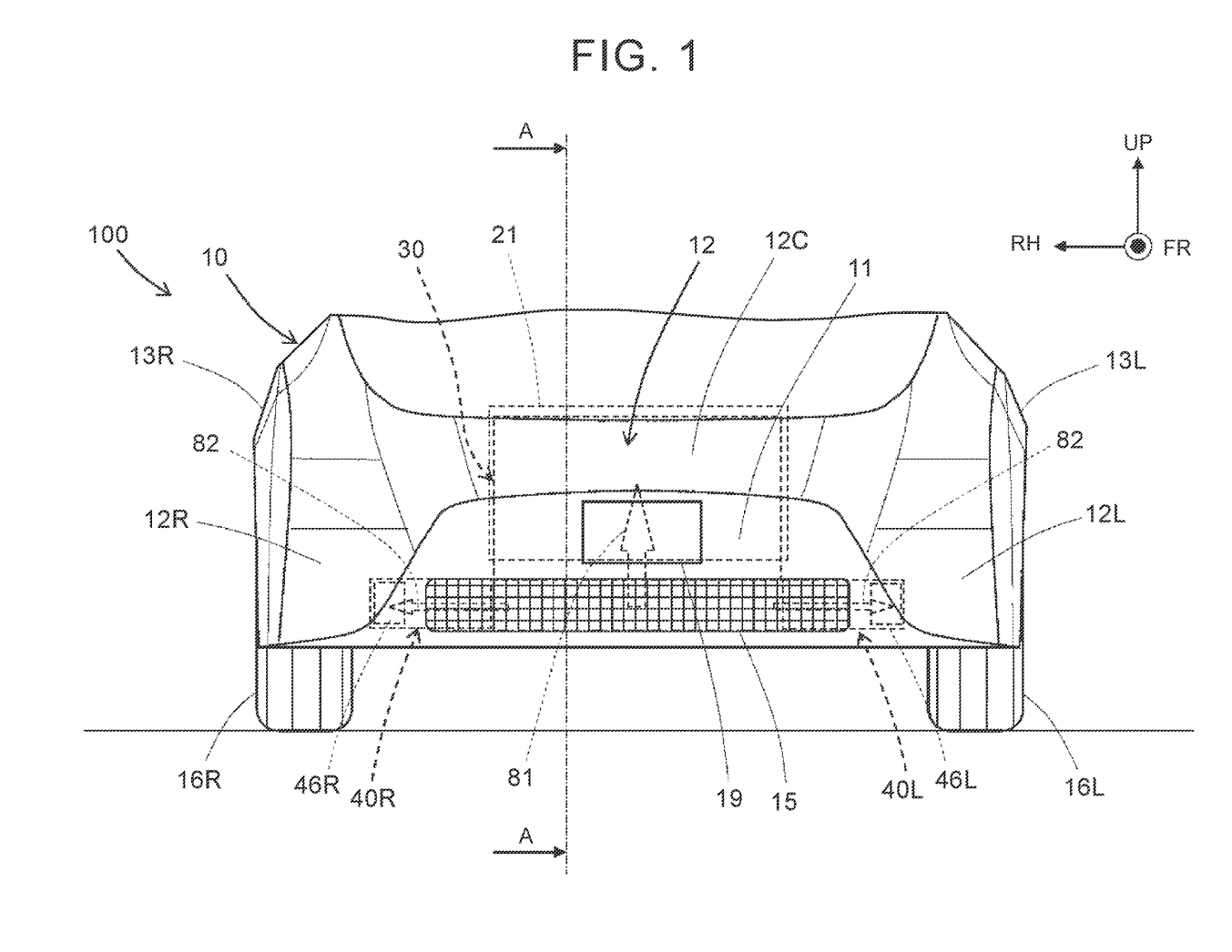
FIG. 1 is a front elevational view of a vehicle in an embodiment.

As shown in FIG. 1, a lower front design panel 11 and an upper front design panel 12 are attached to the vehicle front end of the body 10 of the vehicle 100. The lower front design panel 11 and the upper front design panel 12 are partitioned by thin partition grooves, and the paint color is different, but the surface is substantially continuous. The upper front design panel 12 includes a center portion 12C that is slightly curved in a convex manner toward the front of the vehicle, and a left end portion 12L and a right end portion 12R that extend from the center portion 12C toward the left side and the right side and cover the front of the left and right front wheels 16L, 16R. The left end portion 12L is connected to a left design panel 13L that is curved toward the rear of the vehicle and is configured to bulge to the vehicle widthwise outer end of the left front wheel 16L. Similarly, the right end portion 12R is connected to the right design panel 13R.

The lower front design panel 11 constitutes a part surrounded by the left end portion 12L and the right end portion 12R on the lower side of the center portion 12C of the upper front design panel 12. A grille opening 15 for introducing cooling air is provided in the center of the lower front design panel 11. A license plate 19 is attached to the upper side of the grille opening 15 at the center of the lower front design panel 11.

Figure 2:
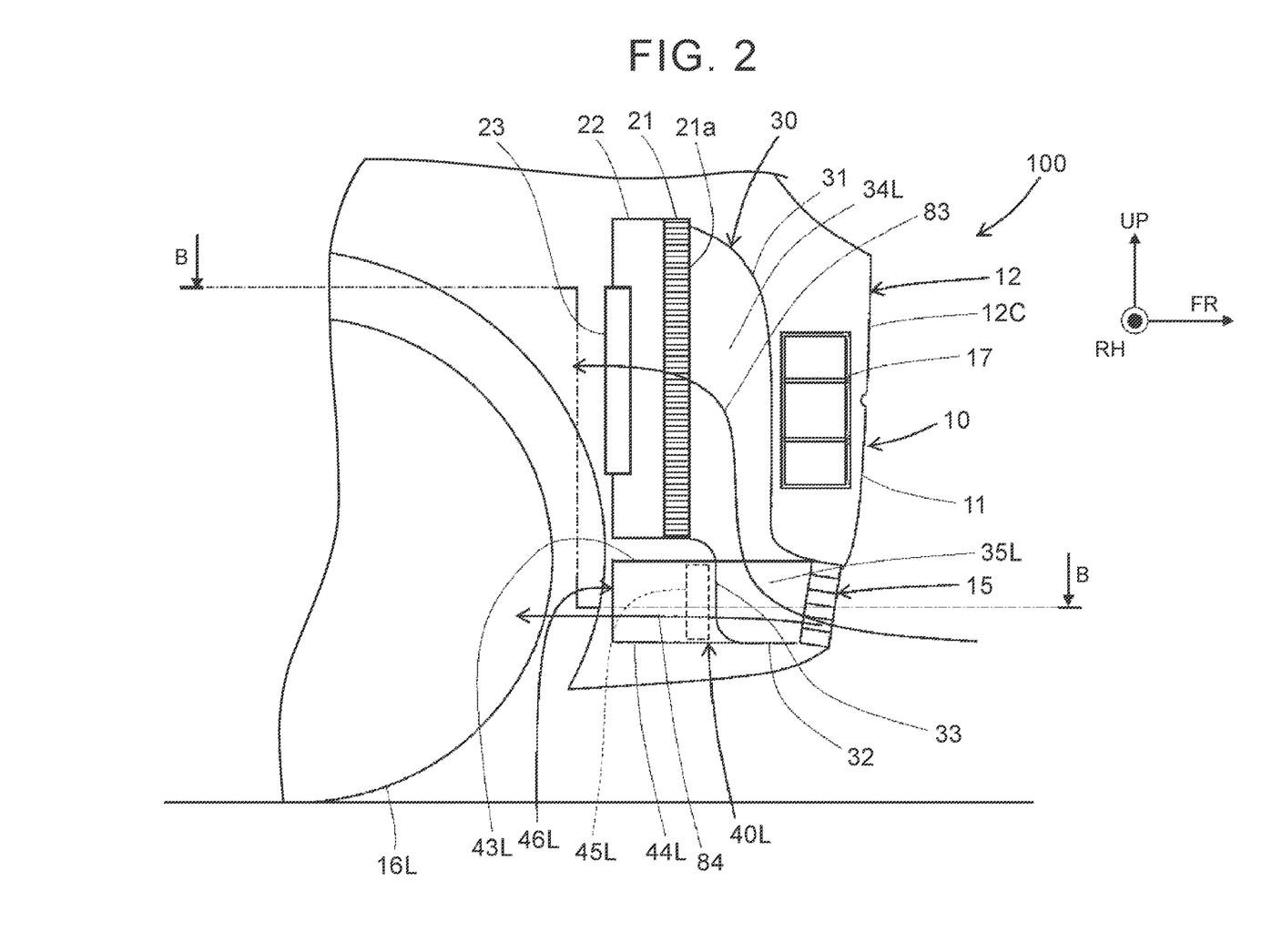
FIG. 2 is a cross-sectional view of a front portion of the vehicle according to the embodiment, and is a cross-sectional A-A shown in FIG. 1.

As shown in FIG. 2, a bumper reinforcement 17 extending in the vehicle width direction is disposed behind the vehicle of the upper front design panel 12. A radiator 21 that cools coolant of a motor, an engine, or the like of the vehicle 100 is attached to the vehicle rear side of the bumper reinforcement 17. A fan casing 22 is connected to the rear of the radiator 21, and a fan 23 is attached to the center of the fan casing 22.

A grille opening 15 provided in the lower front design panel 11 and an inlet 21a of the radiator 21 are connected by a radiator air guide duct 30. The radiator air guide duct 30 is a duct having a rectangular cross section long in the vehicle width direction, and guides the cooling air introduced from the grille opening 15 to the radiator 21 as indicated by arrows 83 in FIG. 2, open arrows 81 in broken lines in FIG. 1, and arrows 85 and 86 in FIG. 3.

Figure 3:
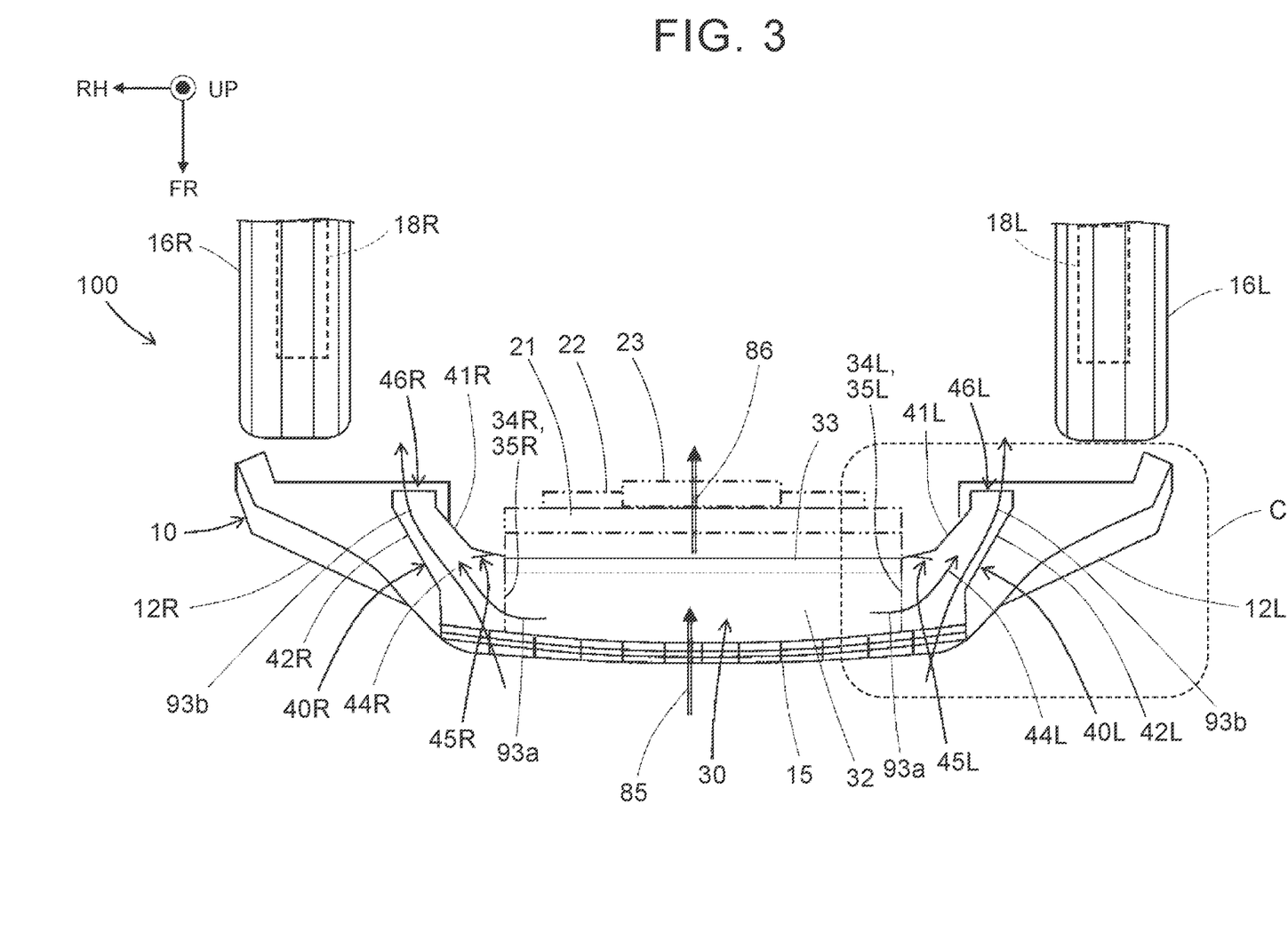
FIG. 3 is a cross-sectional view of a front B-B of the vehicle of the embodiment, and is a cross-sectional view shown in FIG. 2.

More specifically, the radiator air guide duct 30 includes a front plate 31, a lower plate 32, a rear plate 33, a left side plate 34L, and a right side plate 34R (see FIG. 3). The front plate 31 is curved upward from the upper end of the grille opening 15 and is connected to the upper end portion of the radiator 21. A left side plate 34L and a right side plate 34R are connected to the left and right end portions of the front plate 31, respectively. The rear portions of the left side plate 34L and the right side plate 34R are connected to the left and right end portions of the inlet 21a of the radiator 21. The lower plate 32 extends from the lower end of the grille opening 15 toward the rear of the vehicle. The rear plate 33 is connected to the rear end of the lower plate 32, curved upward, and then curved rearward to be connected to the lower end of the radiator 21. Opening 35L (see FIG. 3) and 35R are provided at the lower end portions of the left side plate 34L and the right side plate 34R of the radiator air guide duct 30, respectively.

As shown in FIG. 3, the left brake duct 40L and the right brake duct 40R are connected to the left and right openings 35L, 35R. The left brake duct 40L and the right brake duct 40R are ducts having a square cross section that are connected to both vehicle widthwise ends of the radiator air guide duct 30 and extend obliquely rearward of the vehicle. The left brake duct 40L and the right brake duct 40R guide a part of the cooling air flowing into the radiator air guide duct 30 toward the brakes 18L, 18R of the left and right front wheels 16L, 16R, as indicated by the arrow 93a in FIG. 3, the open arrow 82 in the broken line in FIG. 1, and the arrow 84 in FIG. 2.

More specifically, as shown in FIGS. 2 and 3, the left brake duct 40L includes a center side plate 41L, an outer plate 42L, an upper plate 43L (see FIG. 2), and a bottom plate 44L. The bottom plate 44L is connected to the left end of the lower plate 32 of the radiator air guide duct 30 and the lower end portion on the left side of the grille opening 15, and extends obliquely rearward of the vehicle. The upper plate 43L is connected to the upper end of the opening 35L of the radiator air guide duct 30 and the upper end portion on the left side of the grille opening 15, and extends to the left diagonally rearward side of the vehicle, parallel to the bottom plate 44L. The center side plate 41L vertically connects the end portions of the upper plate 43L and the center side of the bottom plate 44L in the vehicle-width-direction. Further, the right end of the center side plate 41L is connected to the left end of the rear plate 33 of the radiator air guide duct 30.

The outer plate 42L connects the upper plate 43L and the vehicle-width-direction outer end of the bottom plate 44L vertically. The front end of the outer plate 42L is connected to the left end of the grille opening 15. As described above, the center side plate 41L, the outer plate 42L, the upper plate 43L, and the bottom plate 44L constitute a left brake duct 40L having a square cross section. The center side plate 41L, the outer plate 42L, the upper plate 43L, and the rear ends of the bottom plate 44L constitute the outlet 46L of the left brake duct 40L. Further, a backflow suppression plate 45L is provided on an inner surface of the center side plate 41L. The backflow suppression plate 45L will be described later referring to FIG. 4. The right brake duct 40R is symmetrical to the left brake duct 40L, and includes a center side plate 41R, an outer plate 42R, an upper plate (not shown), and a bottom plate 44R, and includes an outlet 46R and a backflow suppression plate 45R.

Part of the cooling air that has flowed into the radiator air guide duct 30 flows into the left brake duct 40L and the right brake duct 40R by flowing the inside of the radiator air guide duct 30 toward the vehicle width-direction outer side, as indicated by the arrow 93a in FIG. 3 and the open arrow 82 of the broken line in FIG. 1, and blows out from the left and right outlets 46L, 46R toward the brakes 18L, 18R of the front wheels 16L, 16R. Further, the cooling-air flowing in from the left and right end portions of the grille opening 15, as shown in the arrow 93b in FIG. 3, flows into the left brake duct 40L and the right brake duct 40R and blows out from the left and right outlets 46L, 46R toward the brakes 18L, 18R of the front wheels 16L, 16R.

Figure 4:
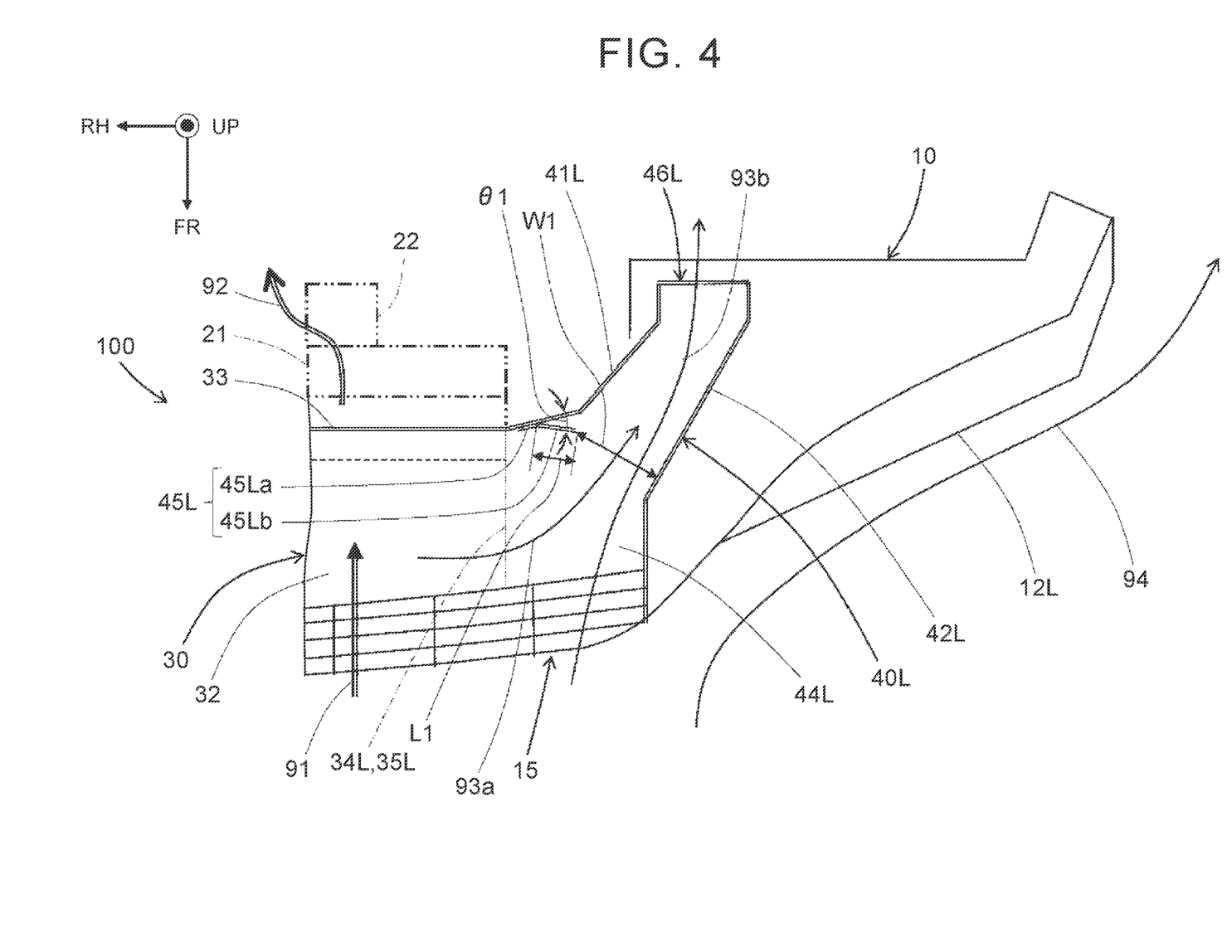
FIG. 4 is an enlarged plan view showing a flow of cooling air during traveling of the vehicle according to the embodiment, and showing a flow of cooling air in the C portion shown in FIG. 3.

Next, referring to FIG. 4, the backflow suppression plate 45L will be described. As shown in FIG. 4, the backflow suppression plate 45L is attached to the center side plate 41L near the inlet of the left brake duct 40L. More specifically, the backflow suppression plate 45L is attached to the right end of the center side plate 41L connected to the left end of the rear plate 33 of the radiator air guide duct 30. The backflow suppression plate 45L includes a base 45La and a plate portion 45Lb. The base 45La is attached to the inner surface of the center side plate 41L. The plate portion 45Lb is bent from the base 45La and protrudes into the left brake duct 40L. The plate portion 45Lb is inclined by an angle $\theta 1$ with respect to the inner surface of the center side plate 41L such that the distal end thereof is separated from the inner surface of the center side plate 41L toward the downstream-side of the left brake duct 40L. Further, the end of the plate portion 45Lb and the inner surface of the outer plate 42L are W1 to each other. W1 is the width of the flow path between the front end of the plate portion 45Lb of the backflow suppression plate 45L and the outer plate 42L. The width-wise W1 is determined such that the flow path area is the area through which the required flow rate of cooling-air can flow to the brake 18L. Further, the angle $\theta 1$ is determined so as to be able to suppress the flow of the warm air flowing backward through the left brake duct 40L.

Next, the flow of air while the vehicle 100 is traveling on the left side will be described with reference to FIG. 4. When the vehicle 100 is traveling, the traveling wind hitting the left end portion 12L of the upper front design panel 12 of the body 10, as shown by the arrow 94 in FIG. 4, after flowing outward in the vehicle width-direction along the front surface of the left end portion 12L, flows out toward the vehicle obliquely rear. Therefore, the traveling wind does not flow into the left front wheel 16L from the left side surface of the vehicle.

On the other hand, during traveling, cooling air flows from the grille opening 15 into the radiator air guide duct 30 as indicated by an arrow 91 in FIG. 4. The cooling air flowing into the radiator air guide duct 30 passes through the radiator 21 as indicated by an arrow 92 in FIG. 4, and flows into the fan casing 22 as hot air having an increased temperature. The hot air flowing into the fan casing 22 is sucked by the fan 23 (see FIG. 3) and flows into the body 10. In addition, during traveling, part of the cooling air that has flowed into the radiator air guide duct 30 from the grille opening 15 flows into the left brake duct 40L from the radiator air guide duct 30 as shown by the arrow 93a in FIG. 4, and merges with the cooling air that has flowed into the left brake duct 40L from the grille opening 15 shown by the arrow 93b in FIG. 4. The combined cooling-air is blown from the outlet 46L toward the brake 18L of the left front wheel 16L through the flow path in the widthwise W1 between the front end of the plate portion 45Lb and the outer plate 42L of the backflow suppression plate 45L. Thus, even when the traveling wind does not flow into the left front wheel 16L, the brake 18L of the left front wheel 16L can be cooled.

Figure 5:
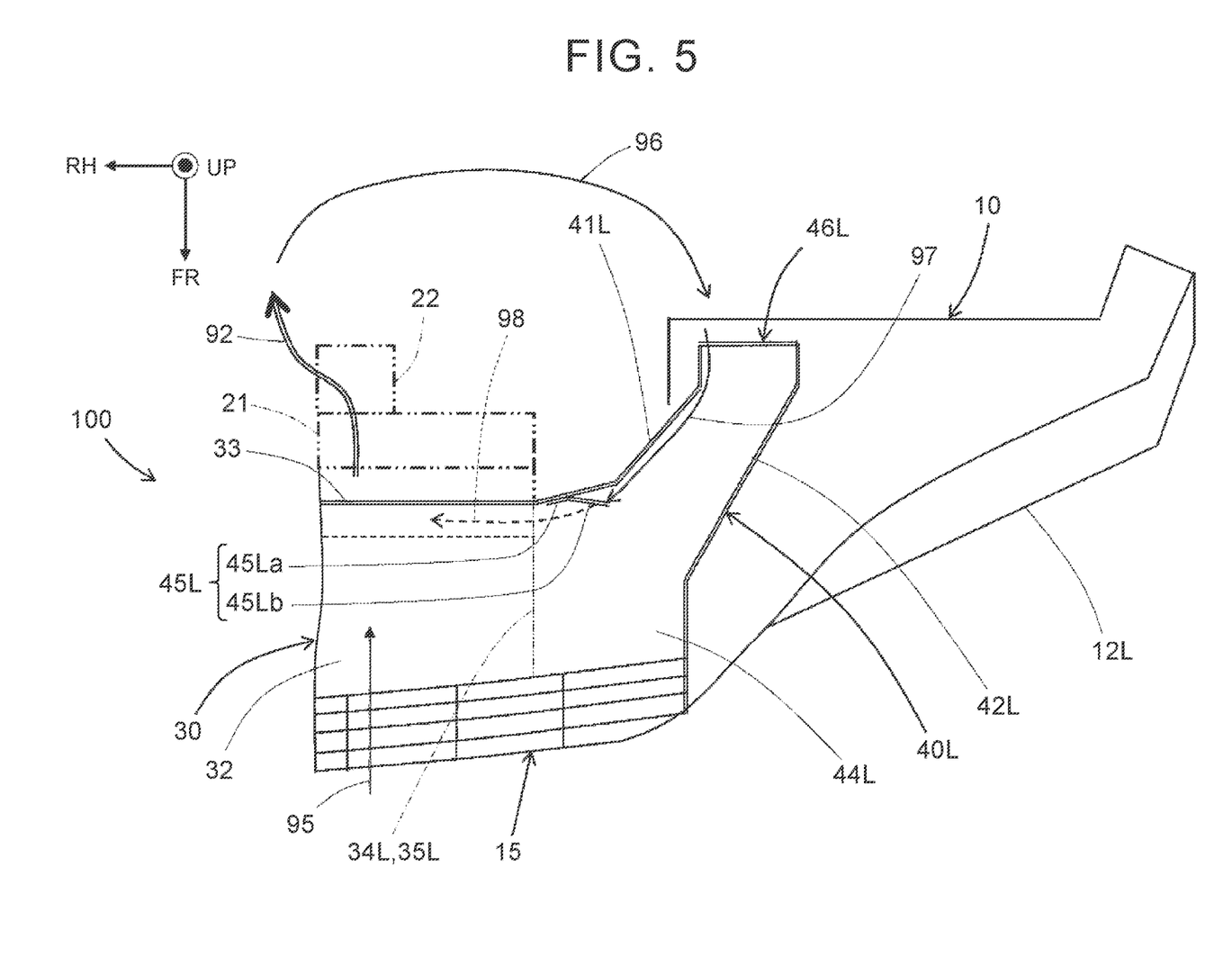
FIG. 5 is a diagram showing a flow of the cooling air during stopping of the vehicle of the embodiment is an enlarged cross-sectional view showing the flow of the cooling air of the C portion shown in FIG. 3.

Next, a flow of air on the left side of the vehicle 100 where the vehicle 100 is stopped will be described with reference to FIG. 5. When the vehicle 100 is stopped, the cooling air caused by the traveling does not flow into the radiator air guide duct 30 through the grille opening 15. On the other hand, the fan 23 is operating even when the vehicle 100 is stopped. Therefore, as indicated by an arrow 92 in FIG. 5, the cooling air inside the radiator air guide duct 30 is sucked toward the radiator 21 by the fan 23, and the cooling air is sucked into the radiator air guide duct 30 from the grille opening 15 as indicated by an arrow 95 in FIG. 5. As in the case of traveling, the hot air that has passed through the radiator 21 and has risen in temperature flows from the fan casing 22 into the body 10.

When the vehicle 100 is stopped, no cooling-air flows in the left brake duct 40L. Therefore, hot air staying inside the body 10, by the operation of the fan 23, as shown by arrows 96, 97, broken line arrow 98 in FIG. 5, flows into the inside of the left brake duct 40L from the outlet 46L, the left brake duct 40L flows backward to try to flow upstream of the radiator 21. Since the reverse flow rate of the hot air is small, the hot air flows along the inner surface of the center side plate 41L of the left brake duct 40L as indicated by an arrow 97 in FIG. 5. The hot air is trapped by the downstream surface of the plate portion 45Lb of the backflow suppression plate 45L and stays inside the left brake duct 40L. Therefore, the hot air cannot flow into the inside of the radiator air guide duct 30 beyond the backflow suppression plate 45 as indicated by the broken line arrow 98 in FIG. 5, and it is possible to suppress the hot air from flowing to the upstream side of the radiator 21.

As described above, the backflow suppression plate 45L can prevent the hot air flowing along the inner surface of the center side plate 41L from flowing into the radiator air guide duct 30 when the vehicle 100 is stopped, and the hot air flows around the upstream side of the radiator 21, thereby reducing the performance of the radiator 21.

Since the air flow on the right side of the vehicle 100 is symmetrical with the air flow on the left side of the vehicle 100, similar to the backflow suppression plate 45L, the backflow suppression plate 45R attached to the right brake duct 40R can also prevent the hot air flowing along the inner surface of the center side plate 41R from flowing into the inside of the radiator air guide duct 30 when the vehicle 100 is stopped, and the hot air flows to the upstream side of the radiator 21 to suppress deterioration of the performance of the radiator 21.

As a result, the vehicle 100 can cool the brakes 18L, 18R of the front wheel 16L, 16R during traveling while suppressing deterioration in performance of the radiator 21 during vehicle stopping.

In the above explanation, the backflow suppression plate 45L is attached to the center side plate 41L in the vicinity of the inlet of the left brake duct 40L, but the present disclosure is not limited thereto. For example, it may be attached to the center side plate 41L of the intermediate portion between the inlet and the outlet 46L of the left brake duct 40L, or it may be attached to the center side plate 41L near the outlet.

Next, a vehicle 200 according to another embodiment will be described with reference to FIG. 6. First, the same parts as those of the vehicle 100 described with reference to FIGS. 1 to 5 are denoted by the same reference numerals, and description thereof will be omitted. The vehicle 200 differs from the vehicle 100 in that the backflow suppression plate 47L is attached to the rear plate 33 of the radiator air guide duct 30. The other parts are the same as those of the vehicle 100.

Figure 6:
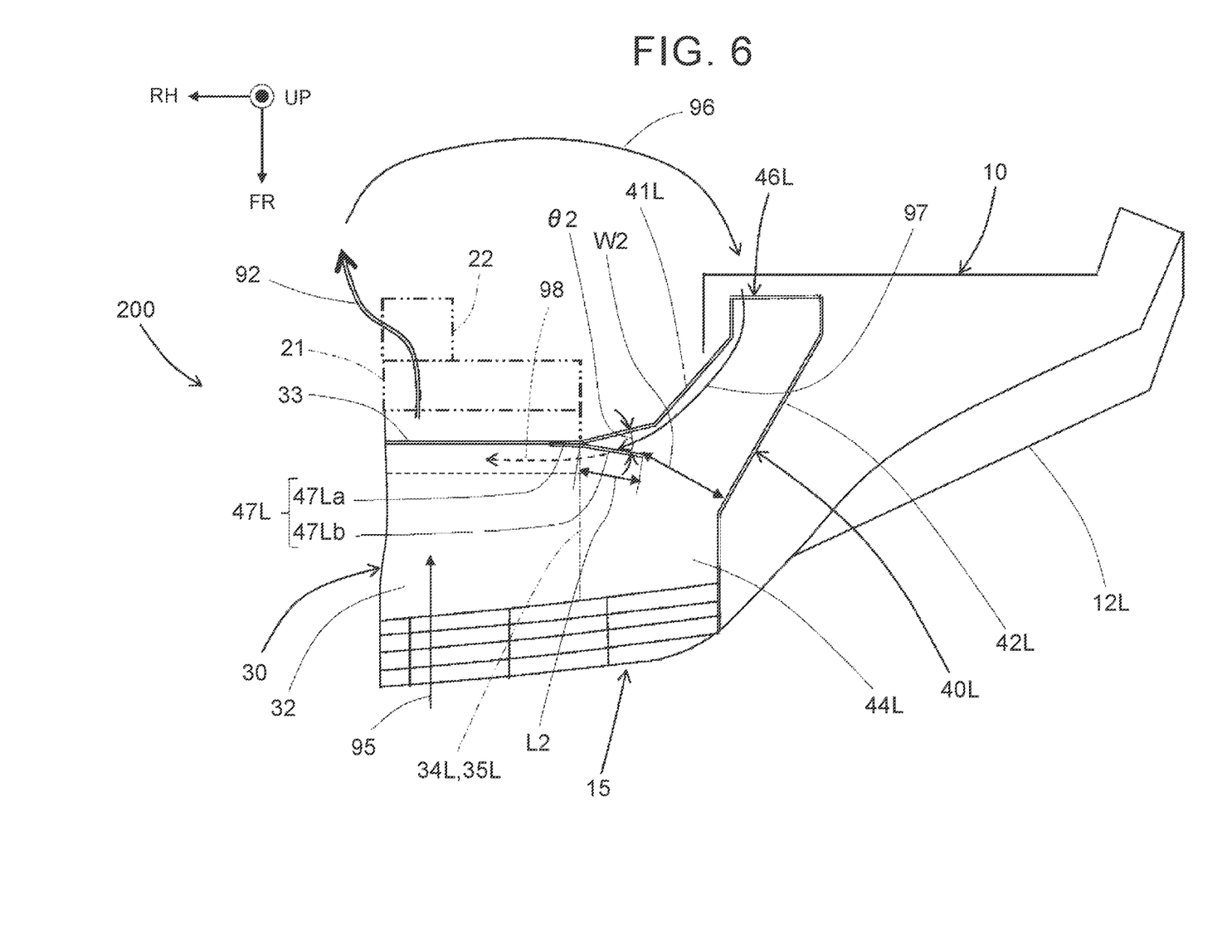
FIG. 6 is a plan cross-sectional view illustrating a flow of cooling air during a stop of a vehicle according to another embodiment.

As illustrated in FIG. 6, the backflow suppression plate 47L includes a base 47La and a plate portion 47Lb. The base 47La is attached to the inner surface of the rear plate 33. The plate portion 47Lb is bent from the base 47La and protrudes from the connecting portion between the rear plate 33 and the center side plate 41L to the inside of the left brake duct 40L. The plate portion 47Lb is inclined by an angle $\theta 2$ with respect to the inner surface of the center side plate 41L such that the distal end thereof is separated from the inner surface of the center side plate 41L toward the downstream-side of the left brake duct 40L. Further, the end of the plate portion 47Lb and the inner surface of the outer plate 42L are W2 to each other. W2 is the width of the flow path between the front end of the plate portion 47Lb of the backflow suppression plate 47L and the outer plate 42L. The widthwise W2 is determined such that the flow path area is the area through which the required flow rate of cooling-air can flow to the brake 18L. Further, the angle θ2 is determined so as to be able to suppress the flow of the warm air flowing backward through the left brake duct 40L.

The backflow suppression plate 47L, like the backflow suppression plate 45L described above, can prevent the hot air flowing along the inner surface of the center side plate 41L from flowing into the radiator air guide duct 30 when the vehicle 200 is stopped, and the performance of the radiator 21 from being deteriorated by being circulated to the upstream side of the radiator 21. Therefore, the vehicle 200 can cool the brakes 18L, 18R of the front wheel 16L, 16R during traveling while suppressing deterioration in performance of the radiator 21 at the time of stopping the vehicle, similarly to the vehicle 100.

What is claimed is:

1. A vehicle comprising:
   a grille opening that is provided in a center of a design panel in a vehicle width direction at a front end of the vehicle and that introduces cooling air;
   a radiator air guide duct that guides the cooling air introduced from the grille opening to a radiator;
   a brake duct that is connected to each end of the radiator air guide duct in the vehicle width direction and that guides a part of the cooling air flowing into the radiator air guide duct toward a brake of a front wheel; and
   a backflow suppression plate configured to:
      protrude from a center side plate of the brake duct or a rear plate of the radiator air guide duct toward an inner side of the brake duct; and
      suppress hot air after passing through the radiator from flowing back through the brake duct and from flowing toward an upstream side of the radiator.

2. The vehicle according to claim 1, wherein:
   the backflow suppression plate is attached to the center side plate; and
   the backflow suppression plate is inclined such that a tip of the backflow suppression plate is separated from the center side plate toward a downstream side of the brake duct.

3. The vehicle according to claim 1, wherein:
   the backflow suppression plate is attached to the rear plate of the radiator air guide duct;
   the backflow suppression plate protrudes from a connecting portion between the rear plate and the center side plate to the inner side of the brake duct toward a downstream side of the brake duct; and
   the backflow suppression plate is inclined with respect to the center side plate such that a tip of the backflow suppression plate is separated from the center side plate toward the downstream side of the brake duct.

* * * * *